(12) United States Patent
Suzuki et al.

(10) Patent No.: US 6,583,958 B1
(45) Date of Patent: Jun. 24, 2003

(54) MAGNETIC RECORDING MEDIUM AND MAGNETIC STORAGE SYSTEM USING SAME

(75) Inventors: Hiroyuki Suzuki, Fujisawa (JP); Yuzuru Hosoe, Hino (JP); Kiwamu Tanahashi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 09/654,307

(22) Filed: Sep. 1, 2000

(30) Foreign Application Priority Data

Nov. 18, 1999 (JP) .......................... 11-327762

(51) Int. Cl.[7] .............................................. G11B 5/82
(52) U.S. Cl. ..................................................... 360/135
(58) Field of Search .............................. 360/313, 135, 360/131

(56) References Cited

U.S. PATENT DOCUMENTS

| | | | | |
|---|---|---|---|---|
| 4,769,282 A | * | 9/1988 | Tada et al. ................ | 428/336 |
| 6,129,981 A | * | 10/2000 | Okuyama et al. .......... | 324/252 |
| 6,266,210 B1 | * | 7/2001 | Shiroishi .................... | 360/126 |

FOREIGN PATENT DOCUMENTS

| | | | |
|---|---|---|---|
| JP | 60-228637 | | 11/1985 |
| JP | 60-228637 A | * | 11/1985 |
| JP | 2-73511 | | 3/1990 |
| JP | 2674131 | | 7/1997 |

* cited by examiner

*Primary Examiner*—William Klimowicz
*Assistant Examiner*—Julie Anne Watko
(74) *Attorney, Agent, or Firm*—Kenyon & Kenyon

(57) ABSTRACT

Provided are a low-noise, high-performance magnetic recording medium obtained by fining the size of the grains in a magnetic film, and a magnetic recording medium of low thermal demagnetization obtained by controlling the magnetic grain size in a small range. Simultaneously provided is a large-capacity magnetic storage system capable of high-density recording with a recording density exceeding 20 Gb/inch[2]. In a magnetic recording medium in which a magnetic layer is formed on a substrate via an underlayer, the magnetic layer is formed of an alloy containing cobalt as the main constituents and containing boron, chromium and germanium or containing phosphorus, chromium and germanium as additives of the alloy.

12 Claims, 5 Drawing Sheets

DIRECTION OF TRANSFER OF SUBSTRATE

DIRECTION OF TRANSFER OF SUBSTRATE

DIRECTION OF TRANSFER OF SUBSTRATE

FIG. 9

MAGNETIC RECORDING MEDIUM AND MAGNETIC STORAGE SYSTEM USING SAME

BACKGROUND OF THE INVENTION

The present invention relates to a magnetic recording medium and a magnetic storage system which are capable of recording a large amount of information and, more particularly, to a magnetic recording medium suitable for high-density magnetic recording and a magnetic storage system in which this magnetic recording medium is used.

Needs for large-capacity design of magnetic storage systems are growing more and more. In recent years, to meet the needs, it has rapidly proceeded to adopt a composite type head in which a writing head and a reproducing head are separately provided and in which a highly sensitive magneto-resistive head is used as the reproducing head. Further, a more highly sensitive head has also been put to practical use. In this more highly sensitive head, in order to increase the sensitivity of a magneto-resistive head that utilizes a change in the electric resistance of elements caused by a change in the leakage flux from a medium, there is utilized a very large magnetoresistance change (giant magnetic resistance effect or spin-valve effect) occurring in a plurality of magnetic films layered via a non-magnetic film. This head utilizes the phenomenon that the relative magnetization direction of a plurality of magnetic films layered via the non-magnetic film is changed by a leakage magnetic field, resulting in a change in magnetoresistance.

On the other hand, as requirements for high-density design of magnetic recording mediums, a noise reduction and a reduction in a regenerative output change occurring with the lapse of time due to thermal fluctuations are necessary.

In order to realize a recording density exceeding 20 Gb/inch$^2$ in a magnetic disk medium, it is necessary to increase coercivity and besides to reduce the unit of magnetization reversal occurring in a magnetic film. For this purpose, it is necessary to make magnetic grains fine in size which constitute the magnetic film.

JP-B-2674131 discloses a thin magnetic film which is expressed by a composition equation (Coa Ptb Bc Mä)100−x Ox (where a, b, c, δ, x are atomic %), and has composition ranges of:

$0<a=100-b-c-\delta;$ $0<b\leq 50;$ $0.1\leq c\ b\leq 30;$ $0<\delta\leq 30;$ and $0\leq x\leq 15$ where, the above M is at least one kind selected from the group consisting of Ti, Zr, V, Cr, Nb, Mo, Ta, W, Fe, Ni, Si, Al, Ge, Ga, In, Sn, Pb, Sb, Bi, P, Se, C, Zn, Cu, Ag, Au, Ru, Pd and Re.

As an example in which this thin magnetic film is applied to a magnetic recording medium, JP-A-2-73511 discloses a CoPt-base alloy or CoPto-base alloy magnetic recording medium which has a thin magnetic film containing B or at least one kind selected from the following group of elements MI, wherein the above thin magnetic film is formed on an underlayer which contains at least one kind selected from the following group of elements MII and has a thickness of 1 to 1×104 nm (1×10 to 1×105 Å). The thin magnetic film contains, as the above elements MI, at least one kind selected from the group consisting of Ti, Zr, V, Cr, Nb, Mo, Ta and W and, the underlayer contains, as the above elements MII, at least one kind selected from the group consisting of Ti, Zr, V, Cr, Nb, Mo, Ta, W, Hf, Mn, Re, Fe, Ru, Os, Co, Rh, Ir, Ni, Pd, Pt, Cu, Ag, Au, Zn, Cd, B, Al, Ga, In, Ti, C, Si, Ge, Sn, Pd, P, As, Sb, Bi, S, Se, Te, Be, Mg, Ca, Sr, Ba, Sc, Y and rare-earth elements.

Further, there is proposed in JP-A-60-228637 a Co-base alloy for magnetic recording medium's which contains Cr in an amount of 9.0 to 22.5 wt., %, at least one kind selected from the group consisting of Sc, V, Nb, Ta, W, Mn, Tc, Re, Fe, Os, Ir, Ni, Pd, Pt, Cu, Ag, Au, Zn, Cd, B, Al, Ca, In, Tl, C, Si, Ge, Sn, Pb, P, As, Sb, Bi, S, Se, Te, lanthanoid elements and actinoid elements in an amount of 0.001 to 5 wt. % in total, and the balance Co.

SUMMARY OF THE INVENTION

The technology described in the above JP-B-2674131 relates to a perpendicular magnetic recording medium and was unsuitable for longitudinal magnetic recording because of a larger perpendicular coercivity than a longitudinal coercivity. Further, in the conventional technology described in JP-A-2-73511, there is proposed a medium structure for improving perpendicular coercivity, longitudinal coercivity or perpendicular magnetic anisotropy. However, when a magnetic recording medium was formed by optionally selecting Cr and Ru, respectively, from the above element groups MI and MII, it was difficult to reduce medium noise and hence it was necessary to further reduce the noise. Further, there was a limit to the control of the crystal grain size of a magnetic film constituting the above magnetic disk medium, and fine grains and coarse ones coexisted in the magnetic film. Such magnetic films were affected by a leakage magnetic field from surrounding magnetic grains in information recording and, inversely, coarse magnetic grains gave interactions, with the result that stable signal regeneration was sometimes impossible in high-density recording with a recording density exceeding 20 Gb/inch$^2$.

The technology described in the above JP-A-60-28637 relates to a perpendicular magnetic recording medium and it was necessary to adjust saturation magnetization to not more than 8.5×10$^{-2}$ T (850 gauss) which is a practical range. Saturation magnetization of not more than 8.5×10$^{-2}$ T (850 gauss) was too small and this perpendicular magnetic recording medium was inappropriate for a material composition for longitudinal magnetic recording.

Further, the present inventors have found out that making the distribution of magnetic grain size uniform, along with making magnetic grains fine in size, is important for a reduction in thermal fluctuations.

Therefore, the first object of the invention is to provide a low-noise, high-performance magnetic recording medium by making magnetic grains fine in size through the optimization of the composition of a magnetic film.

The second object of the invention is to provide a magnetic recording medium of low thermal demagnetization by controlling the distribution of the magnetic grain size in a small range.

The third object of the invention is to provide a large-capacity magnetic storage system capable of high-density recording with a recording density exceeding 20 Gb/inch$^2$.

In the magnetic recording medium having a recording film formed of at least one magnetic layer formed on a substrate via an underlayer, the above first object is achieved when the above at least one magnetic layer is formed of an alloy containing cobalt as the main constituent thereof, chromium and germanium as the additives of the alloy and containing boron or phosphorus as the third additive of the alloy. The above first object is more readily achieved by use of layered structure having at least two underlayers as the above underlayer. Furthermore, when the residual magnetic flux density of the above recording film measured while applying a magnetic field in the relative traveling direction of a magnetic head during recording to the recording medium is expressed as Br while the thickness of the above recording film is expressed as "t", it is preferred that the value of the product Br×t be not less than 1.6 mA but not more than 5 mA. Here, in a case where the recording film is formed of a plurality of magnetic layers, "t" is the total of the thicknesses of all magnetic layers constituting the recording film. Further, in a case where the magnetic recording medium is a magnetic disk medium used in a magnetic disk device, the above expression "relative traveling direction of a magnetic head during recording to the recording medium" means the circumferential direction of the magnetic disk.

Further, it is preferred that, when the third additive is boron, the contents of the boron and germanium both contained in the above at least one magnetic layer be not less than 1 but not more than 14 atomic % and not less than 5 but not more than 22 atomic %, respectively. In this case it is preferred that the content of the chromium contained in the above at least one magnetic layer be not less than 15 but not more than 28 atomic %. When these additives are simultaneously contained, the first and second objects of the invention are simultaneously achieved by fabricating a magnetic recording medium in which it is preferred that the total of the boron and chromium contents is not less than 20 but not more than 32 atomic %.

When the at least one magnetic layer contains platinum as the fourth additive, it is preferred that the content of platinum contained in the at least one magnetic layer formed on a substrate via an underlayer is not less than 2 but not more than 14 atomic % and that the total content of germanium and platinum is not less than 17 but not more than 24 atomic %.

When the third additive is phosphorus, it is preferred that the contents of phosphorus and chronium both contained in the at least one magnetic layer be not less than 1 but not more than 12 atomic % and not less than 15 but not more than 28 atomic %, respectively. The first and second objects of the invention are simultaneously achieved by forming a magnetic recording medium in which the total of the phosphorus and chromium contents is not less than 20 but not more than 32 atomic %. When the at least one magnetic layer contains platinum as the fourth additive, the content of the platinum contained in the magnetic layer is preferably not less than 2 but not more than 14 atomic %.

In a magnetic storage system comprising: the above magnetic recording medium; a drive portion for driving the magnetic recording medium, a magnetic head provided with a writing part and a regenerating part; means for relatively moving the magnetic head with respect to the magnetic recording medium, a mechanical part for ramping the magnetic head; means for inputting signals into the magnetic head; and recording/regenerating signals-processing means for regenerating output signals transferred from the magnetic head, the regenerating part of the magnetic head comprises a magneto-resistive sensor which includes a plurality of electrically conductive, magnetic films in which a large resistance change occurs in response to a relative change of magnetization direction which relative change is caused by an external magnetic field, and a magneto resistive sensor including an electrically conductive, non-magnetic film located between the electrically conductive, magnetic films and, at the same time, the magnetic recording medium is constituted by the magnetic recording medium specifically explained above. As a result of this, the magnetic storage system described in the third object of the invention is obtained.

It is preferred that the above substrate be a rigid substrate, such as a chemically-reinforced substrate with a diameter of 65 mm. However, the diameter of the disk may be 95 mm, for example, and is not limited to 65 mm. The material for the substrate may be made of Ti, etc. if it permits high-speed rotation, and is not limited to glass.

In forming a magnetic recording medium in which a magnetic layer is formed on a substrate via an underlayer, the underlayer may be formed as only one layer of underlayer of Cr—Ti alloy of body-centered cubic structure, etc. However, after the forming of an initially-grown layer of Cr—Ti alloy (a first underlayer), a second underlayer made of another Cr alloy, such as a Cr—Mo alloy, different from the initially-grown layer may be formed. In order to ensure that the Cr alloy forms an interface capable of heteroepitaxial growth with a thin magnetic film of the Co alloy formed thereafter, it is possible to coordinate the lattice constant by adjusting the content of the additives. As a result of this, it becomes possible to form on the Cr alloy underlayer film of body-centered cubic structure the Co alloy magnetic film, in which the c-axis of hexagonal closest packing structure is oriented in parallel with the surface of the film, enabling a medium suitable for longitudinal magnetic recording to be formed. Alternatively, after the formation of a Co—Cr—Zr alloy film as a first bonding layer for improving bonding with the substrate, an Ni—Cr—Zr alloy film may be formed, and after surface adjustment thereof, an underlayer made of the Cr alloy and the magnetic layer maybe formed in this order.

As mentioned above, the above first object is achieved when the at least one magnetic layer is formed of the alloy containing cobalt as the main constituent thereof and containing boron, chromium, germanium and platinum or containing phosphorus, chromium, and germanium as the additives of the alloy, because the addition of boron or phosphorous promotes, the fining of the size of grains, because the addition of chromium accelerates the decrease in magnetic coupling, enabling noise in the medium to be reduced, and because the addition of germanium reduces thermal fluctuations and simultaneously and promotes the segregation of chromium, resulting in noise reduction, all these factors producing a synergistic effect.

As mentioned above, when the residual magnetic flux density of the above recording film measured by applying the magnetic field in the relative traveling direction of the magnetic head during recording relative to the recording medium is expressed as Br and the thickness of the above recording film is expressed as t, it is preferred that the value of the product Br×t be not less than 1.6 mA but not more than 5 mA, because of the reason explained below. When the value of Br×t is smaller than 1.6 mA, the regenerative output becomes too small and simultaneously it becomes difficult to reduce thermal fluctuations in cases where the magnetic head described in the embodiments described below is used. On the other hand, when the value of Br×t exceeds 5 mA, the signal regenerative output obtained when recording is performed at the maximum linear recording density used in a magnetic storage system decreases greatly with respect to isolated pulse output and the signal processing of regenerative output becomes difficult, posing a problem that the probability of occurrence of errors increases.

When the contents of added boron and chromium or the contents of added phosphorus and chromium are increased in order to reduce magnetic interactions, the grain size of the magnetic layer increases with increasing film thickness although medium noise tends to decrease. In order to prevent this, grains were able to be fined in size by forming a magnetic layer with a raised boron or phosphorus content in the upper part of the magnetic layer which is formed on the side opposite to the substrate, and this was effective in reducing the medium noise. Furthermore, the layering of the magnetic layer via a non-magnetic intermediate layer having the same crystal structure as the magnetic layer was also effective in reducing the medium noise.

Also when the boron or phosphorus content is less than 1 atomic %, the grains of a magnetic layer are fined in size by the addition of boron or phosphorus. However, when the boron or phosphorus content is low, the effect of the addition of these elements on the fining of grain size of the magnetic layer made of the cobalt-base alloy which simultaneously contains germanium and chromium is small.

On the other hand, when boron is added in an amount exceeding 14 atomic % to the cobalt-base alloy which simultaneously contains germanium and chromium, a sputtering target became brittle, posing a problem that working was difficult. Therefore, it is preferred that the boron content be not less than 1 but not more than 14% atomic %. A more preferred range of boron content is not less than 2 but not more than 8 atomic %.

A regenerative output change occurred with the lapse of time in a room-temperature, high-humidity environment in a magnetic recording medium formed through the use of an alloy target in which phosphorus was added in an amount exceeding 12 atomic % to the cobalt-base alloy simultaneously containing germanium and chromium. This decrease in output is due to a decrease in the corrosion resistance of a magnetic film. Because decrease in the phosphorus content improves corrosion resistance, it is preferred that the phosphorus content be not less than 1 but not more than 12 atomic %. A more preferred range of phosphorus content is not less than 2 but not more than 8 atomic %.

Also when the chromium content is from 5 to not more than 15 atomic %, the addition of: boron or phosphorus; and germanium promotes the segregation of chromium at the grain boundaries of the magnetic layer. When chromium is added in an amount of not less than 15 atomic %, this effect becomes more remarkable and the addition of chromium is effective in reducing noise. However, when chromium is added in an amount exceeding 28 atomic %, the remanent magnetic flux density decreases, with the result that the regenerative output becomes too small. Therefore, it is preferred that the chromium content be not less than 15 but not more than 28 atomic %.

With respect to the above ranges of content of the additives, when the total of the boron and chromium contents or the total of phosphorus and chromium contents is not less than 20 but not more than 32 atomic %, the segregation effect of chromium is great and sufficient regenerative output is obtained and, therefore, this range of contents is preferred.

Furthermore, when platinum is added to a cobalt alloy containing the above boron, chromium and germanium or when platinum is added to a cobalt alloy containing the above phosphorous, chromium and germanium, coercivity can be improved and thermal fluctuations can be easily reduced. By replacing a part of platinum with germanium, it becomes possible to lower the melting point of a sputtering target and thereby to raise the degree of migration of atoms during the formation of the thin film. The platinum content is effective when it is not less than 2 atomic %, and the second object can be achieved when the platinum content is up to 50 atomic %. However, when the platinum content is higher than 14 atomic %, the overwriting characteristic during high-frequency recording is deteriorated. When the platinum content is not less than 2 but not more than 14 atomic %, the first and second objects of the invention are simultaneously achieved and mediums obtained in the first and second objects can be used as mediums for achieving the third object. The content of platinum capable of being added as a magnetic recording medium for a magnetic storage system with a relatively high linear recording density and low writing frequency is not less than 2 but not more than 22 atomic %. The overwriting characteristic was deteriorated when the platinum content exceeded 22 atomic %.

When the germanium content is raised, the segregation of Cr is promoted and the addition of germanium becomes very effective in reducing medium noise, and coercivity can be maintained at a high level even when the platinum content is lowered. Therefore, it is preferred that the total of the germanium and platinum contents be in the range of 17 to about 24 atomic %. The effect of the addition of germanium on the above promotion of segregation of Cr and the remarkable reduction in medium noise was observed when the germanium content was not less than 5 atomic %. On the other hand, when the germanium content exceeded 22 atomic %, the yield of target working decreased. Therefore, it is preferred that the germanium content be not less than 5 to not more than 22 atomic %.

With respect to the regeneration noise of signals recorded at a high density exceeding 500 kFCI (kilo flux change per inch) for which a high density recording exceeding 20 Gb/inch$^2$ was supposed, an examination was performed regarding the dependence on the contents of: the boron or phosphorus; and chromium contained in the above magnetic layer. As a result, when the total of the contents of: the boron or phosphorus; and chromium contained in the above magnetic layer was reduced to less than 20 atomic %, the regeneration noise of signals recorded at 550 kFCI and 600 kFCI became large in both cases in comparison with other case where the total of the contents of: the boron or phosphorus; and chromium contained in the above magnetic layer was not less than 20 atomic %. Thus, this was unfavorable for reducing noise. Further, when the total of: the boron or phosphorus content; and the chromium content exceeds 32 atomic %, the absolute value of regenerative output becomes small. From the standpoint of regenerative output, therefore, it is preferred that the total of the boron or phosphorus content; and the chromium content be not more than 32 atomic %.

DETAILED DESCRIPTION OF THE PREFERRED EMBODIMENTS

Embodiments of the invention will be described in detail below by referring to the drawings.

Embodiment 1

Figure 1:
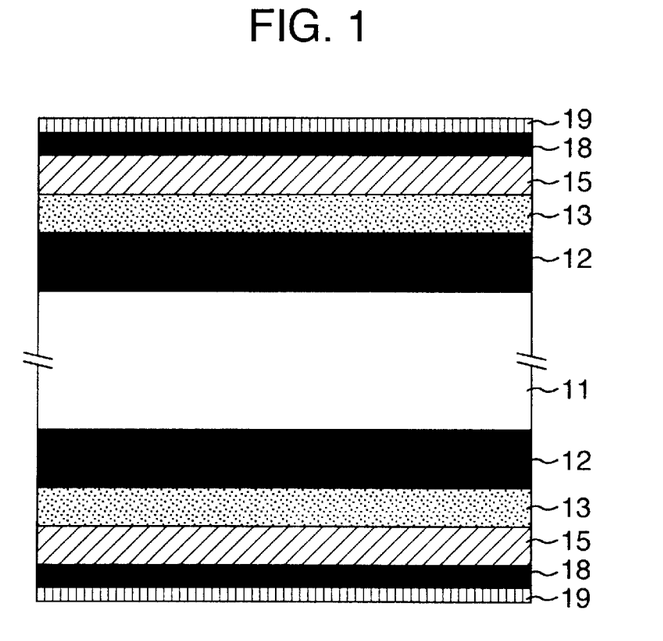
FIG. 1 is a sectional structure of an embodiment of a magnetic recording medium of the invention.
Figure 2:
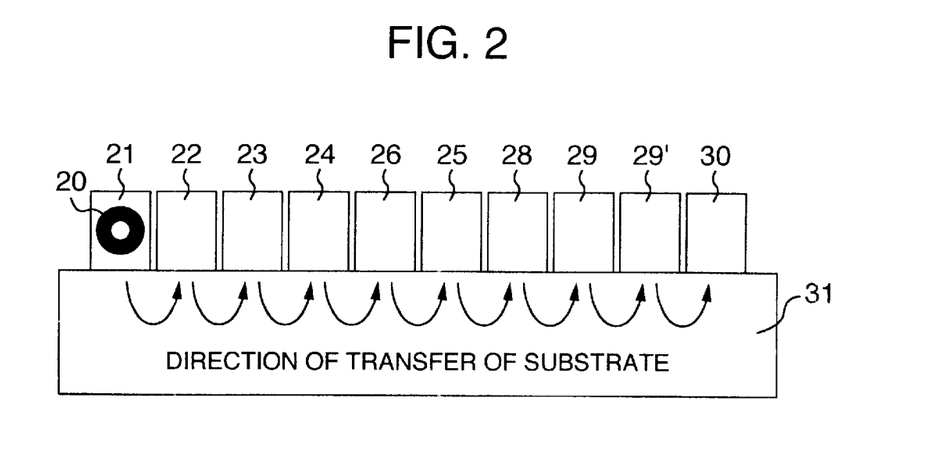
FIG. 2 is a schematic view of chambers of a sputtering device used in Embodiments 1 and 7.

FIG. 1 is a sectional structure of an embodiment of a magnetic recording medium of the invention. As a substrate 11, an aluminosilicate glass substrate of 0.635 mm in thickness and 65 mm in diameter with a chemically-reinforced surface was used. After the cleaning of this substrate, the following multilayer film was formed by use of a stationary type sputtering devices (MDP250B) made by Intevac, Inc., at a tact of 9 seconds. The arrangement of chambers of the sputtering devices is shown in FIG. 2. First, in the first, underlayer-forming chamber 22, a first underlayer 12 of 15 nm in thickness which contains Cr as the main constituent was formed on both sides of the substrate 11. After than, in a heating chamber 23 the temperature of the substrate was heated to about 230° C. by use of a lamp heater and then, in a second-underlayer forming chamber 24 a Cr-12 at. % W alloy target was sputtered and a second underlayer 13 was formed. In a magnetic-layer-forming chamber 26, a magnetic layer 15 was formed on the second underlayer 13 by sputtering a Co-4 at. % B-19 at. %Cr-10 at. % Ge alloy target. The value of Br×t measured through the use of a sample-vibrating type magnetometer was about 3.2 mA (40 gauss. micrometers). In two protective-layer-forming chambers 29 and 29', a protective layer 18 each 2 nm thick with a total thickness of 4 nm was formed on the magnetic layer 15. After that, the substrate was taken out of the sputtering device and a 2-nm thick lubricating layer 19 was formed by applying a lubricant, which contains perfluoroalkyl polyther as the main constituent, to the protective layer.

In the formation of all the above first underlayer 12, second underlayer 13 and magnetic layer 15, Ar was used as an electric discharge gas and the gas pressure was 0.93 Pa (7 mTorr). Further, in the formation of the protective layer 18 made of carbon, nitrogen-containing Ar was used as an electric discharge as and the gas pressure was 1.33 Pa (10 mTorr).

A magnetic recording medium thus formed was cut, a layered thin film portion thereof being thinned from the top toward the bottom into a mortar shape in the vertical direction of the thin film by the ion thinning process, and the grain size of the magnetic layer was observed at an accelerating voltage of 200 kV by use of a transmission electron microscope. As a result, the average grain size of the magnetic layer was 12.8 nm and the standard deviation of the grain size was 2.8 nm. In determining the average grain size, the area of each grain was circle-approximated, the average grain size was found from an arithmetic mean of the diameter thereof, and a D2 gauss distribution function was assumed. The fitting rage adopted was from an average grain size of 4 nm to the maximum grain size of +2 nm in the histogram. Further, it was ascertained with the aid of a microanalyzer that the atomic % of each constituent of the magnetic layer was substantially equal to the atomic % of each constituent of the alloy target for forming magnetic layers.

The magnetic properties of a magnetic disk obtained were evaluated through the use of a sample-vibrating type magnetometer. The longitudinal coercivity was 255 kA/m, the coercive squareness S* was 0.7, the saturation magnetic flux density Ms was about 0.4 T, and the squareness was 0.7.

As the above substrate 11, ceramics made of soda-lime glass, silicon, borosilicate glass, etc., or glass-glazed ceramics, or Al—Mg alloy substrates to which Ni—P is electroless-plated, or rigid substrates made of glass-to which Ni—P is electroless-plated, etc., may be used in place of the chemically-reinforced aluminosilicate. As the first underlayer and the second underlayer, it is also possible to use a thin film of a Cr-base alloy which forms an irregular solid solution having good crystal conformity with the magnetic layer and capable of (100) orientation, such as non-magnetic Cr—V, Cr—Mo, Cr—W, Cr—Ti or Cr—Si. By adding oxygen in an amount of about 1,000 to 10,000 ppm to these underlayers, it is also possible to reduce medium noise.

After washing and drying the substrate of aluminosilicate glass in which a surface portion of 0.635 mm in thickness and 65 mm in diameter thereof is chemically-reinforced, a tape of polyimide is adhered to the substrate. By using the stationary type sputtering device;(MDP250B) made by Intevac, Inc., a single layer film explained below was formed at a tact of 9 seconds on the substrate to which the polyimide tape was adhered. Then, after heating the substrate at about 230° C. in a heating chamber 23 by use of a lamp heater, the first magnetic layer 15 was formed in the first, magnetic-layer-forming-chamber 26 by sputtering a target of Co-4 at. %B-19 at. %Cr-10 at. %Ge alloy. The polyimide tape on which the magnetic layer 15 was formed, was peeled off each of five pieces of the glass substrates. By ICPS-analyzing the thin film formed on each of the polyimide tapes, the analyzing of the composition of the thin film was performed, with the result that the composition of the thin film was Co-3.8 at. %B-19.3 at. %Cr-9.5 at. %Ge. From this result, the composition of the thin film which was obtained by the ICPS analysis was substantially the same one as that of the sputter target.

Comparative Example 1

By sputtering the same Co-4 at. % B-19 at. % Cr alloy target as in the above Embodiment 1, a first magnetic layer 15 was formed in a first, magnetic-layer-forming chamber 26. A magnetic recording medium was formed by adopting the same structure regarding other layers as in Example 1. As a result, the average grain size of the magnetic layer was 13.4 nm and the standard deviation of grain size was 4.1 nm. The magnetic properties of a magnetic disk obtained were evaluated by use of the vibrating sample magnetometer. The longitudinal coercivity was 207 kA/m, the coercive squareness S* was 0.67, the saturation magnetic flux density Ms being about 0.51 T, and the squareness was 0.71.

The magnetic recording mediums fabricated in Comparative Example 1 and Embodiment 1 were held for 96 hours in the same high-temperature tank and generative output changes occurring with-the lapse of time were compared at 70° C. A decrease ratio (1−E96/E01) of the regenerative output after a lapse of 96 hours (E96) to the regenerative output after a lapse of 1:minute (E01) with recording at 275 KFC was higher in the magnetic recording medium fabricated in Comparative Example 1 than in the magnetic recording medium fabricated in Embodiment 1.

Embodiment 2

Figure 3:
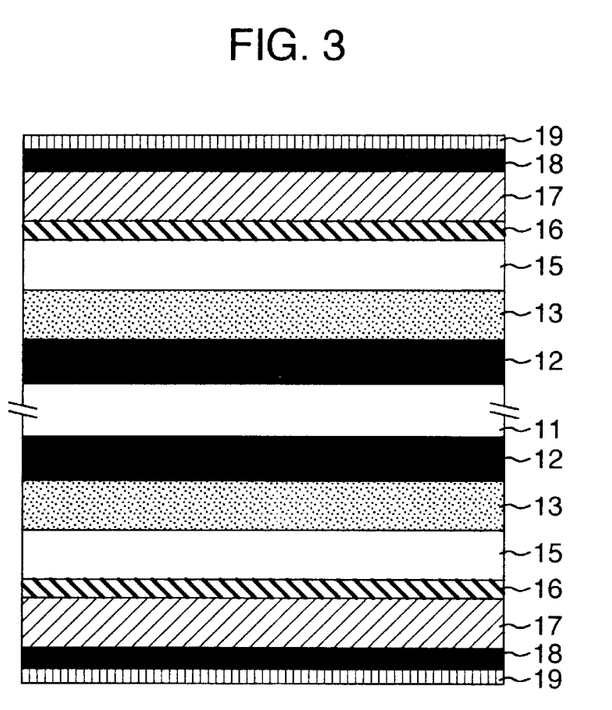
FIG. 3 is a sectional structure of a magnetic recording medium of Embodiments 2 and 8.
Figure 4:
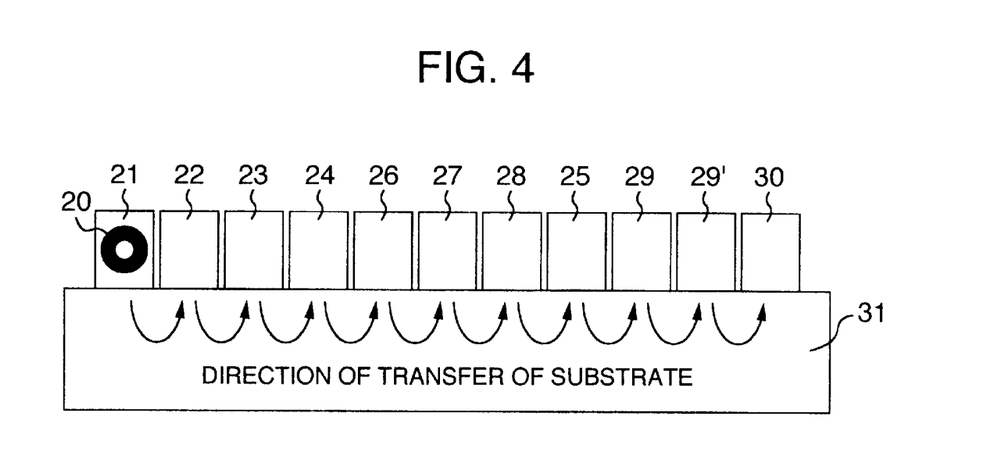
FIG. 4 is a schematic view of chambers of a sputtering device used in Embodiments 2 and 8.

A sectional structure of a magnetic recording medium of this embodiment is shown in FIG. 3, and the arrangement of the chambers of sputtering devices is shown in FIG. 4. After the formation of a first magnetic layer 15 by sputtering a Co-4 at. % B-18 at. % Cr-10 at. %-Ge alloy target in the first, magnetic-layer-forming chamber 26, an intermediate layer 16 with a varied thickness of 0, 0.4, 0.8, 1.5 and 2.8 nm being formed by sputtering a Co-37 at. % Cr alloy target in an intermediate-layer-forming chamber 27, and a second magnetic layer 17 was formed by sputtering a Co-4 at. % B-18 at. % Cr-10 at. %-Ge alloy target in a second, magnetic-layer-forming chamber 28. A magnetic recording medium was formed by the same method as in Embodiment 1 with the exception of the above-described operations. Here, the case where the thickness of the intermediate layer 16 is 0 is a case where the magnetic layers were formed in both of the first, magnetic-layer-forming chamber 26 and the second, magnetic-layer-forming chamber 28. Further, the electric discharge time during the formation of each of the magnetic layers in the first, magnetic-layer-forming chamber 26 and the second, magnetic-layer-forming chamber 28 was 5 seconds and the film thickness of each magnetic layer was controlled by controlling power input.

The magnetic properties of these magnetic recording mediums were measured. The longitudinal coercivity was 239 to 251 kA/m, the coercive squareness S* being 0.66 to 0.72, the saturation magnetic flux density Ms being about 0.4 T, and the squareness was 0.67 to 0.74. The magnetic properties did not depend on the thickness of the intermediate layer. The read/write performance of these magnetic recording mediums was measured by causing a head with a shield gap length of 0.1 $\mu$m and a write gap length of 0.2 $\mu$m to mechanically float from the magnetic recording medium. As a result, the medium noise in a case where the thickness of the above intermediate layer 16 was 1.5 nm decreased most in comparison with the magnetic recording medium fabricated in Embodiment 1 and the decrease rate was about 18%. When the thickness of the intermediate: layer 16 was 1.5 nm, the average grain size of the magnetic layer was 7.2 nm and the standard deviation of grain size was 1.5 nm.

Embodiment 3

Figure 5:
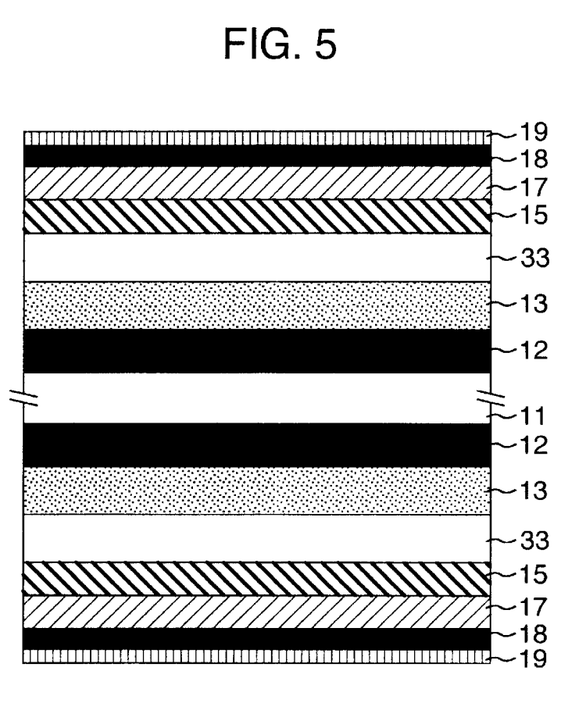
FIG. 5 is a sectional structure of a magnetic recording medium of Embodiments 3 and 9.
Figure 6:
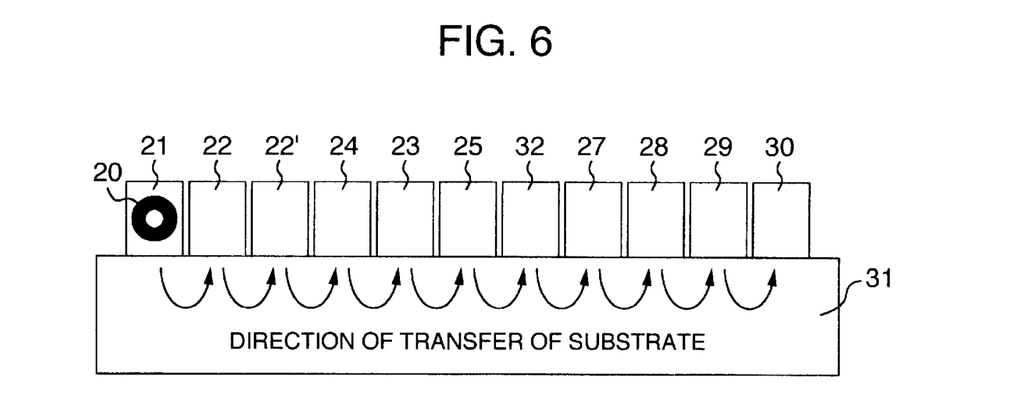
FIG. 6 is a schematic view of chambers of a sputtering device used in Embodiments 3 and 9.

A sectional structure of a magnetic recording medium of this embodiment is shown in FIG. 5 and the arrangement of chambers of sputtering devices used in this embodiment is shown in FIG. 6. First, in the first, underlayer-forming chambers 22 and 22', a first underlayer 12 of 40 nm in thickness made of an Ni-20 at. % Cr-10 at. % Zr alloy was formed on both sides of a substrate 11 and then, and in a second-underlayer forming chamber 24 a second underlayer 13 of 10 nm in thickness made of a Co-30 at. % Cr-10 at. % Zr alloy was formed on the first underlayer 12. After that, in a heating chamber 23 the temperature of the substrate was heated to about 230° C. through the use of a lamp heater. After that, in an oxidation chamber 25 the second underlayer 13 was exposed to an atmosphere of Ar-1 vol. % O$_2$ mixture gas at a pressure of 0.67 Pa (5 mTorr, gas flow rate 21 sccm). After that, in a third, underlayer-forming chamber 32 a third underlayer 33 of 27 nm in thickness made of a Cr-20 at. % Ti alloy was formed, and in a first-magnetic layer forming chamber 27 a magnetic layer 15 of 8 nm in thickness made of a Co-22 at. % Cr-12 at. % Pt alloy was formed on the third underlayer 33. After that, in a second, magnetic-layer-forming chamber 28, a magnetic layer 17 of 8 nm in thickness made of a Co-15 at. % Cr-5 at. % B-10 at. % Ge alloy was formed on the first magnetic layer 15. After that, in a protective-layer forming chamber 29 a protective layer 18 of 4 nm in thickness was formed on the second magnetic layer 17. After that, the substrate was taken out of the sputtering device and a 2-nm thick lubricating layer 19 was formed by applying a lubricant, which contains perfluoroalkyl polyether as the main constituent, to the protective layer.

In the formation of all the above first underlayer 12, second underlayer 13, third underlayer 33 and magnetic layers 15 and 17, Ar was used as an electric discharge gas and the gas pressure was 0.93 Pa (7 mTorr). Further, in the formation of the protective layer 18 made of carbon, nitrogen-containing Ar was used as another electric discharge gas and the gas pressure was 1.33 Pa (10 mTorr).

A magnetic recording medium thus formed was cut, a layered thin film portion thereof was thinned from the top toward the bottom into a mortar shape in the vertical direction of the thin film by the ion thinning process, and the microstructure of the first and second magnetic layers was observed at an accelerating voltage of 200 kV by use of a transmission electron microscope. As a result, it was ascertained that the grain size of the magnetic layers was not more than 15 nm.

The magnetic properties of a magnetic disk thus obtained were evaluated by use of a sample-vibrating type magnetometer by applying a magnetic field in a relative traveling direction of a magnetic head with respect to the magnetic recording medium during recording. The coercivity was 248 kA/m, the coercive squareness being 0.76, and the value of Br×t, which is the product of remanent magnetic flux density Br and thickness t of the recording film, was 3.6 mA (45 gauss.micrometers).

The third underlayer is used as an underlayer for controlling the crystalline orientation of the magnetic layer formed thereon. By forming the second underlayer under this third underlayer, the crystallizability of the third underlayer can be improved. Further, by ensuring that the second underlayer is a layer which is substantially amorphous and contains the same elements as the first underlayer, the adhesion between the second and first underlayers is increased and high sliding resistance can be obtained. In addition, the surface of the second underlayer has no periodic configuration of atoms over a long distance and, therefore, it is possible to fine the size of the grains of the third underlayer formed on the second underlayer and to control crystalline orientation. As a result of this, it was possible to control the average size of grains constituting the magnetic layer to fine sizes suitable for a noise reduction and simultaneously to control the direction of the easy axis of magnetization to a direction parallel to the film surface suitable for longitudinal magnetic recording.

As the third underlayer, it is also possible to use a thin film of a Cr-base alloy which forms an irregular solid solution having good crystal conformity with the magnetic layer and capable of (100) orientation, such as non-magnetic Cr—V, Cr—Mo, Cr—W, Cr—Ti and Cr—Si.

By using the same process as in the composition analysis of the magnetic film described in Embodiment 1, the magnetic film 17 of a single layer having a thickness of 8 nm was formed in the second magnetic layer-forming chamber 28 by sputtering the target made of a Co-15 at. % Cr-5 at. % B-10 at. % Ge alloy. As the result of the composition analysis by use of the ICPS, the composition of the magnetic thin film was Co-14.8 at. % Cr-4.9 at. % B-10.3 at. % Ge. In view of this result, the thin film formed by sputtering had the substantially same composition as that of the alloy target.

Embodiment 4

In the formation of the magnetic recording medium described in Embodiment 1, instead of sputtering the Co-4 at. % B-18 at. % Cr-10 at. % Ge alloy target in the first, magnetic-layer-forming chamber 26, magnetic recording mediums each having Br×t of about 3 mA (40 gauss.micrometers) were made by use of the following targets:

a (Co-4.1 at. % B-15.7 at. % Cr alloy)-Ge pellet-affixed target, a (Co-3.8 at. % B-16 at. % Cr-10.3 at. % Ge alloy)-Cr pellet-affixed target, a Co-4.1 at. % B-22 at. % Cr-9.7 at. % Ge alloy target, a Co-8 at. % B-24.2 at. % Cr-9.9 at. % Ge alloy target, a Co-2.2 at. % B-18 at. % Cr-10.1 at. % Ge alloy target, a Co-6.1 at. % B-14.3 at. % Cr-10.4 at. % Ge alloy target, a Co-4.2 at. % B-22 at. % Cr-10.2 at. % Ge-9.8 at. % Pt alloy target, a Co-5 at. % B-15 at. % Cr-12 at. % Ge-10 at. % Pt alloy target, a Co-4 at. % B-28 at. % Cr-5 at. % Ge-12 at. % Pt alloy target, a Co-6 at. % B-26 at. % Cr-9 at. % Ge-8 at. % Pt alloy target, a Co-8 at. % B-22 at. % Cr-15 at. % Ge-7 at. % Pt alloy target, and a Co-8 at. % B-22 at. % Cr-22 at. % Ge-2 at. % Pt alloy target.

In the case where the Co-8 at. % B-24.2 at. %Cr-9.9 at. % Ge alloy target was used, the coercivity of the medium decreased to 184 kA/m when it was ensured that the value of Br×t, which is the product of remanent magnetic flux density Br and thickness t of the recording film, became almost 3 mA, the above remanent magnetic flux density being measured through the use of a sample-vibrating type magnetometer by applying a magnetic field in a relative traveling direction of a magnetic head with respect to the magnetic recording medium during recording.

Embodiment 5

In the formation of the magnetic recording medium described in Embodiment 1, instead of sputtering the Co-4 at. % B-19 at. % Cr-10 at. % Ge alloy target in the first, magnetic-layer-forming chamber 26, magnetic recording mediums each having Br×t of about 3 mA (40 gauss.micrometers) were made by use of the following targets:

(1) a Co-20 at. % Cr-10 at. % Ge alloy target, (2) a Co-20 at. % Cr-10 at. % Ge-6 at. % B alloy target, (3) a Co-20 at. % Cr-10 at. % Ge-6 at. % B-12 at. % Pt alloy target, and (4) a Co-12 at. % Pt-6 at. % B-20 at. % Ru alloy target.

The saturation magnetic flux density of the targets decreases in the order of Target (1) to Target (4), and in order to obtain the same value of Br×t, it was necessary to increase the thickness of the magnetic film in the order of the mediums produced from Target (1) to (4). Hereinafter, the mediums for which Targets (1) to (4) were used are referred to as Medium (1) to Medium (4). The characteristics of these targets are shown in Table 1.

TABLE 1

| Medium | Magnetic alloy target | Average grain size (nm) | Longitudinal Coercivity (kA/m) | Medium Noise (μVrms) | Re (%) | Remarks |
|---|---|---|---|---|---|---|
| (1) | Co-20 at. % Cr-10 at. % Ge | 15.4 | 302 | 33.9 | 53 | Comparative Example |
| (2) | Co-20 at. % Cr-10 at. % Ge-6 at. % B | 12.9 | 261 | 27.8 | 52 | The invention |
| (3) | Co-20 at. % Cr-10 at. % Ge-6 at. % B-12 at. % Pt | 12.5 | 336 | 29.6 | 57 | The invention |
| (4) | Co-12 at. % Pt-6 at. % B-20 at. % Ru | 12.1 | 286 | 37.9 | 50 | Comparative Example |

The average grain size of the magnetic layers was analyzed in the same method as in Embodiment 1.

Medium (1) which does not contain any boron has a larger average grain size of the magnetic layer than other mediums. From this it became apparent that the grains of the magnetic layer can be fined in size by the addition of boron.

In addition, the longitudinal coercivity of the mediums was measured by applying a magnetic field in a relative traveling direction of a magnetic head with respect to the magnetic recording medium during recording. Medium (1) which does not contain any platinum has a somewhat lower longitudinal coercivity than other mediums.

Further, by use of the magnetic head described in Embodiment 2, medium noise was measured in a case where signals at 550 kFCI (kilo flux change per inch) were recorded. Here, each isolated pulse output at 20 kFCI measured in the mediums formed through the use of Targets (1) to (4) was within ±2 of average value. The output resolution, Re, which is an index of ratio of the output at 275 kFCI, E275, to this isolated pulse output, Eiso, was also measured. The output resolution is defined by Re=E275/Eiso×100 (%).

Medium (2) which contains boron and germanium as low medium noise and shows a good characteristic. Medium (3) which contains also platinum ,besides boron and germanium has higher medium noise than Medium (2). However, Medium (3) has a high output resolution and is suitable for a magnetic disk system with a high disk rotation speed of not less than 117 s−1, which produces relatively high system noise. On the other hand, Medium (2) is suitable for a magnetic disk system with a high disk rotation speed of not more than 100 s−1, which produces relatively low system noise.

As mentioned above, by using as a magnetic film a cobalt alloy which contains born, chromium and germanium or which contains boron, chromium, germanium and platinum, it is possible to obtain a magnetic recording medium which has good recording and regenerating characteristics at a high linear recording density exceeding 500 kFCI.

By using the same process as in the composition analysis of the magnetic film described in Embodiment 1, the composition of each of the magnetic film formed by sputtering the targets Nos. 1 to 4 disclosed above was examined with the result that the composition of each of the targets was substantially the same composition of each of the resultant magnetic films.

Magnetic recording mediums were formed by the same method as in Embodiment 1, with the exception of the forming of the magnetic recording mediums in the first, magnetic-layer-forming chamber 26 through the use of Target (3) so that the value of Br×t, which is the product of the remanent magnetic flux density Br and thickness t of the recording film, became 1.4, 1.6, 3, 4, 5 and 6 mA, the above remanent magnetic flux density being measured through the use of a sample-vibrating type magnetometer by applying a magnetic field in a relative traveling direction of a magnetic head with respect to the magnetic recording medium during recording. As a result, when the value of Br×t was 1.4 mA, the effect of thermal demagnetization was great in comparison with the case where the value of Br×t was 1.6 mA, and when Br×t was 6 mA, the output resolution, Re, which is an index of ratio of the output at 275 kFCI, E275, to the isolated pulse output, Eiso, decreased greatly. From these results it became apparent that when the value of Br×t is not less than 1.6 but not more than 5 mA, the effect of thermal demagnetization is not great and hence it is possible to obtain relatively sufficient output resolution, Re, which is an index of ratio of the output at 275 kFCI , E275, to the isolated pulse output, Eiso.

Embodiment 6

Figure 7:
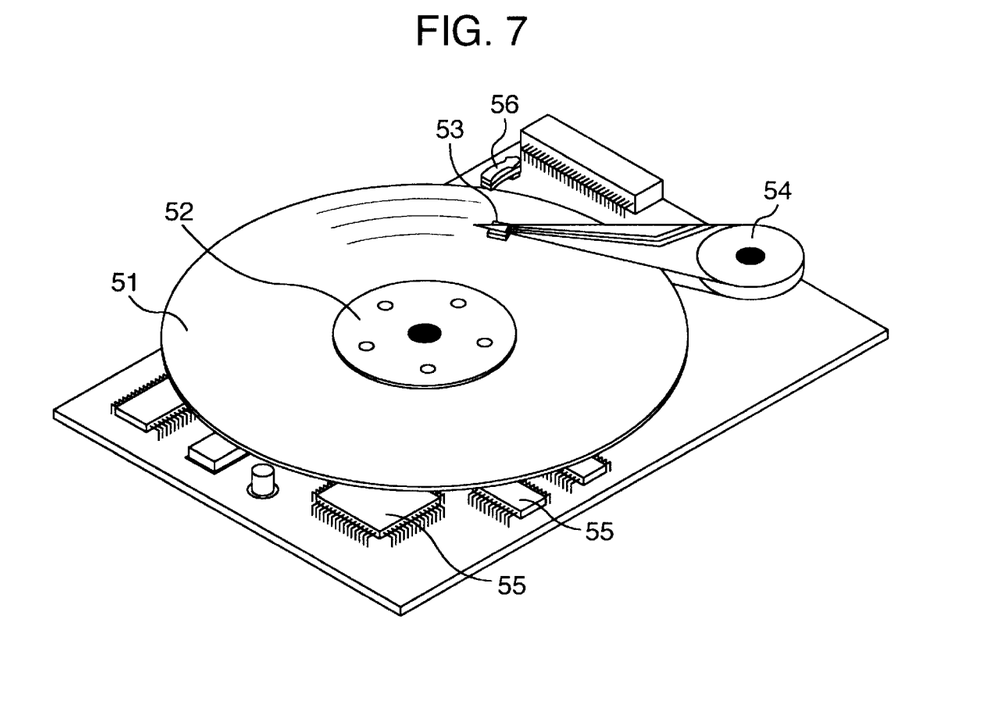
FIG. 7 is a schematic view of a magnetic storage system in which a magnetic recording medium of the invention is used.

A magnetic storage system as shown in FIG. 7 was fabricated. This magnetic storage system comprises a magnetic recording medium 51, which is one of the magnetic recording mediums described in Embodiments 1 to 4 and 13 or one formed by means of Target (3) in Embodiment 5, a drive portion 52 for driving this magnetic recording medium, a magnetic head 53 provided with a writing part and a regenerating part, means for relatively moving the magnetic head with respect to the magnetic recording medium 54, means for inputting signals into the magnetic head, recording, regenerating signals-processing means 55 for regenerating output signals transferred from the magnetic head, and a mechanical part 56 which retracts during unloading.

Figure 8:
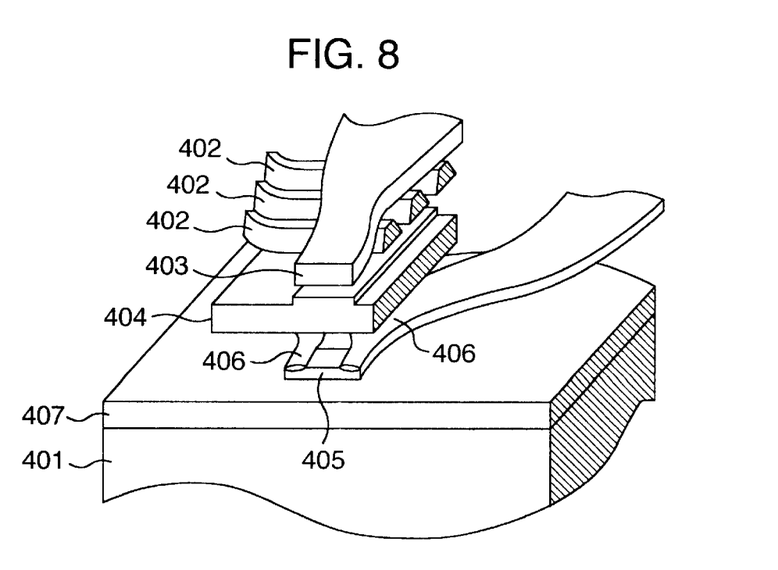
FIG. 8 is a schematic perspective view of the structure of a magnetic head.

The regenerating part of the above magnetic head was formed by a magneto-resistive magnetic head. FIG. 8 is a schematic perspective view of the structure of the magnetic head. This head is a composite type head which combines an electromagnetic head for recording and a magneto-resistive head for regeneration both formed on a substrate 401. The above recording head comprises an upper recording magnetic pole 403 and a lower recording magnetic pole-cum-upper shield layer 404 with coils 402 sandwiched between the two. The gap length of the recording magnetic poles was 0.2 $\mu$m. Copper of 3 $\mu$m in thickness was used as the coils. The above reproducing head comprises a magneto-resistive sensor 405 and electrode patterns 406 provided on both sides thereof. The magneto-resistive sensor is sandwiched between the lower recording magnetic pole-cum-upper shield layer 404 and the lower shield layer 407. The gap between the two shield layers was 0.1 $\mu$m. Incidentally, in this figure, a gap layer between the recording magnetic poles and gap layers between the shield layers are omitted.

Figure 9:
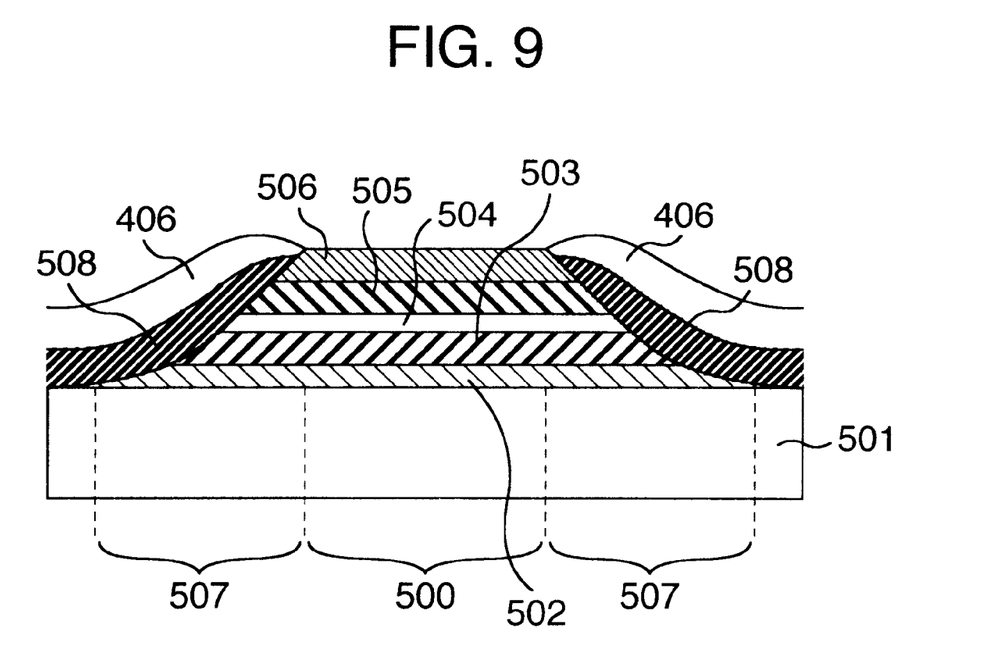
FIG. 9 is a sectional structure of a magneto-resistive sensor.

FIG. 9 is a sectional structure of a magneto-resistive sensor. A signal detection area 500 of the magnetic sensor comprises a magneto-resistive sensor (a spin-valve type regenerating element), which includes a plurality of electrically conductive, magnetic films in which a large resistance change occurs in response to a relative change of magnetization direction which relative change is caused by an external magnetic field, and an electrically conductive, non-magnetic film located between the electrically conductive, magnetic films. The structure of this magnetic sensor is such that a Ta buffer layer 502, a first magnetic film 503, an intermediate layer made of copper 504, a second magnetic film 505 and an antiferromagnetic film made of an Fe-50 at. % Mn alloy are formed in this order on a gap layer 501. An Ni-20 at. % Fe alloy was used in the above first magnetic film, and cobalt was used in the second magnetic film. The magnetization of the second magnetic film is limited to one direction by an exchange magnetic field from the antiferromagnetic film. In contrast to this, the magnetization direction of the first magnetic film, which is in contact with the second magnetic film via the non-magnetic film, changes due to a leakage magnetic film from the magnetic recording medium and, therefore, a resistance change occurs.

At both ends of the signal detection area, there are provided tapered portions 507 which are worked in taper form. The tapered portions comprise permanent magnet layers 508 for converting the first magnetic layer into a single domain and a pair of electrodes 406 for taking out signals formed thereon. It is necessary that the permanent magnet layers have a large coercivity and that the magnetization direction of the permanent magnet layers does not change easily and, therefore, a Co—Cr—Pt alloy was used in the permanent magnet layers.

The magnetic storage system shown in FIG. 7 was fabricated by combining one of the magnetic recording mediums of the invention described in Embodiments 1 to 4 or the magnetic recording medium formed through the use of Target (3) in Embodiment 5 and the above head shown in FIG. 8.

In all cases where any one of the above mediums was used, a recording density of not less than 20 gigabits per inch$^2$ was able to be realized in the magnetic storage system thus fabricated.

As the magnetic head used in this example, a magneto-resistive magnetic head was formed on a magnetic head slider with the area of a floating-face rail of not more than 1.4 mm$^2$ and a mass of not more than 2 mg. The impact resistance reliability of the magnetic head can be improved by this area of a floating-face rail of not more than 1.4 mm$^2$ and the mass of not more than 2 mg. This enabled a high recording density and a high impact resistance to be compatible with each other and as a result, a mean time between failures (MTBF) of not less than 300,000 hours was able to be realized at a recording density of not less than 20 gigabits per inch$^2$.

Embodiment 7

With the exception of the forming of the first magnetic layer 15 by sputtering a Co-4 at. % P-19 at. % Cr-10 at. % Ge alloy target in the first, magnetic layer-forming chamber 26 described in Embodiment 1, a magnetic recording medium was formed by the same method as in Embodiment 1 and was observed under a transmission electron microscope. The average grain size of the magnetic layer was 12.9 nm and the standard deviation of the grain size was 3.4 nm. The magnetic properties of a magnetic disk obtained were evaluated through the use of a sample-vibrating type magnetometer. The value of Br×t was about 3.2 mA (40 gauss.micrometers), the longitudinal coercivity being 272 kA/m, the coercive squareness S* being 0.72, the saturation magnetic flux density Ms being about 0.4 T, and the squareness was 0.7.

As the above substrate 11, a rigid substrate of: ceramics made of soda-lime glass, silicon, boronsilicate glass, etc.; or glass-glazed ceramics; or Al—Mg alloy substrates to which Ni—P is electroless-plated; or glass to which Ni—P is electroless-plated, etc., may be used in place of the chemically-reinforced aluminosilicate. As a first underlayer and a second underlayer, it is also possible to use a thin film of a Cr-base alloy which forms an irregular solid solution having good crystal conformity with the magnetic layer and capable of (100) orientation, such as non-magnetic Cr—V, Cr—Mo, Cr—W, Cr—Ti or Cr—Si. By adding oxygen in an amount of about 1,000 to 10,000 ppm to these underlayers, it is also possible to reduce medium noise.

By using the same process as in the composition analysis of the magnetic film described in Embodiment 1, the composition of the magnetic film formed by sputtering the target disclosed above was examined with the result that the composition of the magnetic film was Co-3.6 at. % P-19.3 at. % Cr-9.8 at. % Ge, with the result that the target composition is substantially the same composition of the resultant magnetic films.

Comparative Example 2

In the above Embodiment 7, the first magnetic layer 15 was formed by sputtering the Co-4 at. % P-19 at. % Cr alloy target in the first, magnetic-layer-forming chamber 26. A magnetic recording medium was formed by adopting the same structure regarding layers other than this first magnetic layer 15, as in Embodiment 7. As a result, the average grain size of the magnetic layer was 13.2 nm and the standard deviation of grain size was 3.9 nm. The magnetic properties of a magnetic, disk obtained were evaluated through the use of a sample-vibrating type magnetometer. The longitudinal coercivity was 220 kA/m, the coercive squareness S* was 0.7, the saturation magnetic flux density Ms was about 0.5 T, and the squareness was 0.7.

The magnetic recording mediums fabricated in Comparative Example 2 and Embodiment 7 were, held for 96 hours in the same high-temperature tank and generative output changes occurring with the lapse of time were compared at 70° C. A decrease ratio (1−E96/E01) of the regenerative output after a lapse of 96 hours (E96) to the regenerative output after a lapse of 1 minute (E01) with recording at 275 KFC was higher in the magnetic recording medium fabricated in Comparative Example 2 than in the magnetic recording medium fabricated in Embodiment 7.

Embodiment 8

A sectional structure of a magnetic recording medium of this embodiment is shown in FIG. 3 and the arrangement of chambers of sputtering devices is shown in FIG. 4. After the formation of a first magnetic layer 15 by sputtering a Co-4 at. % P-18 at. % Cr-10 at. %-Ge alloy target in the first, magnetic-layer-forming chamber 26, an intermediate layer 16 with a varied thickness of 0, 0.4, 0.8, 1.5 and 2.8 nm was formed by sputtering a Co-37 at. % Cr alloy target in an intermediate-layer-forming chamber 27, and a second magnetic layer 17 was formed by sputtering a Co-4 at. % P-18 at. % Cr-10 at. %-Ge alloy target in a second, magnetic-layer-forming chamber 28. A magnetic recording medium was formed by the same method as in Embodiment 7 with the exception of the above-described operations. Here, the case where the thickness of the intermediate layer 16 is 0 is a case where the magnetic layers were formed in both of the first, magnetic-layer-forming chamber 26 and the second, magnetic-layer-forming chamber 28. Further, the electric discharge time during the formation of each of the magnetic layers in the first, magnetic-layer-forming chamber 26 and the second, magnetic-layer-forming chamber 28 was 5 seconds and the film thickness of each magnetic layer was controlled by controlling power input.

The magnetic properties of these magnetic recording mediums were measured. The longitudinal coercivity was 247 to 264 kA/m, the coercive squareness S* was 0.67 to 0.71, the saturation magnetic flux density Ms was about 0.4 T, and the squareness was 0.65 to 0.73. The magnetic properties did not depend greatly on the thickness of the intermediate layer. The electromagnetic conversion characteristic of these magnetic recording mediums was measured by causing a head with a shield gap length of 0.1 μm and a write gap length of 0.2 μm to mechanically float from the magnetic recording medium. As a result, the medium noise in a case where the thickness of the above intermediate layer 16 was 1.5 nm decreased most in comparison with the magnetic recording medium fabricated in Embodiment 7 and the decrease rate was about 18%. When the thickness of the intermediate layer 16 was 1.5 nm, the average grain size of the magnetic layer being 8.1 nm and the standard deviation of grain size was 2.2 nm.

Embodiment 9

A sectional structure of a magnetic recording medium of this embodiment is shown in FIG. 5, and the arrangement of chambers of sputtering devices used in this embodiment is shown in FIG. 6. First, in the first, underlayer-forming chambers 22 and 22, a first underlayer 12 of 40 nm in thickness made of an Ni-20 at. % Cr-10 at. % Zr alloy was formed on each of the sides of a substrate 11 and then, in the second, underlayer-forming chamber 24 a second underlayer 13 of 10 nm in thickness made of a Co-30 at. % Cr-10 at. % Zr alloy was formed on the first underlayer 12. After that, in a heating chamber 23 the temperature of the substrate was heated to about 230° through the use of a lamp heater. After that, in an oxidation chamber 25 the second underlayer 13 was exposed for 3.5 seconds to an atmosphere of Ar-1 vol. % O$_2$ mixture gas at a pressure of 0.67 Pa (5 mTorr, gas flow rate 21 sccm). After that, in a third, underlayer-forming-chamber 32 a third underlayer 14 of 27 nm in thickness made of a Cr-20 at. % Ti alloy was formed, and in a first, magnetic-layer-forming chamber 27 a magnetic layer 15 of 8 nm in thickness made of a Co-22 at. % Cr-12 at. % Pt alloy was formed on the third underlayer 14. After that, in a second, magnetic-layer-forming chamber 28, a magnetic layer 17 of 8 nm in thickness made of a Co-8 at. % P-5 at. % B-15 at. % Cr-10 at. % Ge alloy was formed on the first magnetic layer 15. After that, in a protective-layer-forming chamber 29 a protective layer 18 of 4 nm in thickness was formed on the second magnetic layer 17. After that, the substrate was taken out of the sputtering device and a 2-nm thick lubricating layer 19 was formed by applying a lubricant, which contains perfluoroalkyl polyether as the main constituent, to the protective layer.

In the formation of all the above first underlayer 12, second underlayer 13, third underlayer 14 and magnetic layers 15 and 17, Ar was used as an electric discharge gas and the gas pressure was 0.93 Pa (7 mTorr). Further, in the formation of the protective layer 18 made of carbon, nitrogen-containing Ar was used as an electric discharge gas and the gas pressure was 1.33 Pa (10 mTorr).

A magnetic recording medium thus formed was cut, a layered thin film portion thereof was thinned from the top toward the bottom into a mortar shape from the vertical direction of the thin film by the ion thinning process, and the microstructure of the first and second magnetic layers was observed at an accelerating voltage of 200 kV under a transmission electron microscope. As a result, it was ascertained that the grain size of the magnetic layers was not more than 15 nm.

The magnetic properties of a magnetic disk obtained were evaluated through the use of a sample-vibrating type magnetometer by applying a magnetic field in a relative traveling direction of a magnetic head with respect to the magnetic recording medium during recording. The coercivity was 281 kA/m, the coercive squareness was 0.71, and the value of Br×t, which is the product of remanent magnetic flux density Br and thickness t of the recording film, was 3.6 mA (45 gauss.micrometers).

The third underlayer is used as an underlayer for controlling the crystalline orientation of the magnetic layer formed thereon. By forming the second underlayer under this third underlayer, the crystallizability of the third underlayer can be improved. Further, by ensuring that the second underlayer is a layer which is substantially amorphous and contains the same elements as the first underlayer, the adhesion between the second and first underlayers is increased and high sliding resistance can be obtained. In addition, the surface of the second underlayer has no periodic arrangement of atoms over a long distance and, therefore, it is possible to fine the grain size of the third underlayer formed on the second underlayer and to control crystalline orientation. As a result of this, it was possible to control the average size of grains constituting the magnetic layer to fine sizes suitable for a noise reduction and simultaneously to control the direction of easy axis of magnetization into a direction parallel to the film surface suitable for longitudinal magnetic recording.

As the third underlayer, it is also possible to use a thin film of a Cr-base alloy which forms an irregular solid solution having good crystal conformity with the magnetic layer and capable of (100) orientation, such as non-magnetic Cr—V, Cr—Mo, Cr—W, Cr—Ti or Cr—Si.

Embodiment 10

In the formation of the magnetic recording medium described in Embodiment 7, the following alloy targets were sputtered instead of sputtering the Co-4 at. % B-18 at. % Cr-10 at. % Ge alloy target in the first, magnetic layer-forming chamber 26, so that, magnetic recording mediums each having Br×t of almost 3 mA (40 gauss.micrometers) were made:

a Co-1 at. % P-22 at. % Cr-1 at. % Ge alloy target,
a Co-12 at. % P-20 at. % Cr-10 at. % Ge alloy target,
a Co-5 at. % P-20 at. % Cr-5 at. % Ge alloy target,
a Co-1 at. % P-20 at. % Cr-1 at. % Ge alloy target,
a Co-5 at. % P-22 at. % Cr-10 at. % Ge alloy target,
a Co-5 at. % P-15 at. % Cr-12 at. % Ge-10 at. % Pt alloy target,
a Co-4 at. % P-28 at. % Cr-5 at. % Ge-12 at. % Pt alloy target,
a Co-10 at. % P-22 at. % Cr-15 at. % Ge-7 at. % Pt alloy target, and
a Co-8 at. % P-22 at. % Cr-22 at. % Ge-2 at. % Pt alloy target.

By using the same process as in the composition analysis of the magnetic film described in Embodiment 1, the composition of each of the magnetic films each having a single layer formed by sputtering each of the targets disclosed above was examined by use of the ICPS analysis, with the result that the composition of each of the magnetic films was substantially the same composition of each of the corresponding targets.

In the case where the Co-12 at. % B-20 at. %Cr-10 at. % Ge alloy target was used, the coercivity of the medium increased to 335 kA/m when the value of Br×t, which is the product of remanent magnetic flux density Br and thickness t of the recording film, became almost 3 mA, which remanent magnetic flux density was measured through the use of a sample-vibrating type magnetometer by applying a magnetic field in a relative traveling direction of a magnetic head with respect to the magnetic recording medium during recording.

Comparative Example 3

In the formation of the magnetic recording medium described in Embodiment 7, instead of sputtering the Co-4 at. % P-18 at. % Cr-10 at. % Ge alloy target in the first, magnetic layer-forming chamber 26, another target formed by fixing a phosphorus pellet of 4 mm square onto this Co-4 at. % P-18 at. % Cr-10 at. % Ge alloy target was sputtered, so that magnetic recording mediums with Br×t of almost 3.2 mA (40 gauss.micrometers) were made. Magnetic recording mediums made by this way were held for 1 week at 0° C. at a relative humidity of 88%. The decrease rate of Br×t in magnetic recording mediums formed by increasing the number of phosphorus pellets on the target increased with increasing number of pellets. With some of disks to which phosphorus was added in an amount exceeding 10%, the surface discolored blue.

Embodiment 11

In the formation of the magnetic recording medium described in Embodiment 7, each of the following alloy targets was sputtered instead of sputtering the Co-4 at. % P-19 at. % Cr-10 at. % Ge alloy target in the first, magnetic layer-forming chamber 26, so that magnetic recording mediums each having Br×t of almost 3 mA (40 gauss.micrometers) were made:

(1) a Co-20 at. % Cr-10 at. % Ge alloy target,
(2) a Co-20 at. % Cr-10 at. % Ge-6 at. % Pt alloy target,
(3) a Co-20 at. % Cr-10 at. % Ge-6 at. % P-12 at. % Pt alloy target, and
(4) a Co-12 at. % Pt-6 at. % P-20 at. % Ru alloy target.

The saturation magnetic flux density of the targets decreased in the order of Target (1) to Target (4), and in order to obtain the same value of Br×t, it was necessary to increase the thickness of the magnetic film in the order of the medium for which Target (1) was used to the medium for which Target (4) was used. Hereinafter, the mediums for which Targets (1) to (4) were used are referred to as Medium (1) to Medium (4). The characteristics of these targets are shown in Table 2.

TABLE 2

| Medium | Magnetic alloy target | Average grain size (nm) | Longitudinal Coercivity (kA/m) | Medium Noise ($\mu$Vrms) | Re (%) | Remarks |
|---|---|---|---|---|---|---|
| (1) | Co-20 at. % Cr-10 at. % Ge | 15.4 | 302 | 33.9 | 53 | Comparative example |
| (2) | Co-20 at. % Cr-10 at. % Ge-6 at. % P | 13.2 | 285 | 28.3 | 53 | The invention |

TABLE 2-continued

| Medium | Magnetic alloy target | Average grain size (nm) | Longitudinal Coercivity (kA/m) | Medium Noise (μVrms) | Re (%) | Remarks |
|---|---|---|---|---|---|---|
| (3) | Co-20 at. % Cr-10 at. % Ge-6 at. % P-12 at. % Pt | 12.8 | 347 | 29.8 | 58 | The invention |
| (4) | Co-12 at. % Pt-6 at. % P-20 at. % Ru | 12.3 | 293 | 37.1 | 50 | Comparative example |

The average gain size of the magnetic layers was analyzed in the same method as in Embodiment 1.

Medium (1) which does not contain phosphorus has a larger average grain size of the magnetic layer than other mediums. From this it is apparent that the grains of the magnetic layer can be fined in size by the addition of phosphorus.

In addition, the longitudinal coercivity of the mediums was measured by applying a magnetic field in a relative traveling direction of a magnetic head with respect to the magnetic recording medium during recording. Medium (1) which does not contain platinum has a somewhat lower longitudinal coercivity than other mediums.

Further, with the aid of the magnetic head described in Embodiment 2, medium noise was measured in a case where a signal at 550 kFCI (kilo flux change per inch) was recorded. Here, each isolated pulse output at 20 kFCI measured in the mediums formed through the use of Targets (1) to (4) was within ±2% of average value. The output resolution, Re, which is an index of ratio of the output at 275 kFCI, E275, to this isolated pulse output, Eiso, was also measured. The output resolution is defined by Re=E275/Eiso×100 (%).

Medium (2) which contains phosphorus, chromium and germanium has low medium noise and shows a good characteristic. Medium (3) which contains also platinum besides phosphorus, chromium and germanium has higher medium noise than Medium (2). However, Medium (3) has a high output resolution and is suitable for a magnetic disk system with a high disk rotation speed of not less than 117 s−1, which causes relatively high system noises. On the other hand, Medium (2) is suitable for a magnetic disk system with a high disk rotation speed of not more than 100 s−1, which causes relatively low system noise.

As mentioned above, by using as a magnetic film a cobalt alloy which contains phosphorus, chromium and germanium or which contains phosphorus, chromium, germanium and platinum, it is possible to obtain a magnetic recording medium which has good recording and regenerating characteristics at a high linear recording density exceeding 500 kFCI.

By using the same process as in the composition analysis of the magnetic film described in Embodiment 1, the composition of each of the magnetic films formed by sputtering the targets Nos. 1 to 4 disclosed above was examined with the result that the composition of each of the targets was substantially the same composition of each of the corresponding, resultant magnetic films.

Magnetic recording mediums were formed by the same method as in Embodiment 7, with the exception of the using of Target (3) for forming magnetic recording mediums in the first, magnetic layer-forming chamber 26 so that the value of Br×t, which is the product of the remanent magnetic flux density Br and thickness t of the recording film, became 1.4, 1.6, 3, 4, 5 and 6 mA, the above remanent magnetic flux density being measured through the use of a sample-vibrating type magnetometer by applying a magnetic field in a relative traveling direction of a magnetic head with respect to the magnetic recording medium during recording. As a result, when the value of Br×t was 1.4 mA, the effect of thermal demagnetization was great in comparison with the case where the value of Br×t was 1.6 mA, and when Br×t was 6 mA, the output resolution, Re, which is an index of ratio of the output at 275 kFCI, E275, to the isolated pulse output, Eiso, decreased greatly. From these results it becomes apparent that when the value of Br×t is not less than 1.6 but not more than 5 mA, the effect of thermal demagnetization is not great and hence it is possible to obtain relatively sufficient output resolution, Re, which is an index of ratio of the output at 275 kFCI, E275, to the isolated pulse output, Eiso.

Embodiment 12

A magnetic storage system as shown in FIG. 7 was fabricated. This magnetic storage system comprises a magnetic recording medium 51, which is one of the magnetic recording mediums described in Embodiments 7 to 10 or one formed by means of Target (3) in Embodiment 11, a drive portion 52 for driving this magnetic recording medium, a magnetic head 53 provided with a writing part and a regenerating part, means for relatively moving the magnetic head with respect to the magnetic recording medium 54, means for inputting signals into the magnetic head, recording or regenerating signals-processing means 55 for regenerating output signals transferred from the magnetic head, and a mechanical part 56 which retracts during unloading.

The regenerating part of the above magnetic head was formed by a magneto-resistive magnetic head. FIG. 8 is a schematic perspective view of the structure of the magnetic head. This head is a composite type head which combines an electromagnetic head for recording and a magneto-resistive head for regeneration, both formed on a substrate 401. The above recording head comprises an upper recording magnetic pole 403 and a lower recording magnetic pole-cum-upper shield layer 404 with coils 402 sandwiched between the two. The gap length of the recording magnetic poles was 0.2 μm. Copper of 3 μm in thickness was used as the coils. The above reproducing head comprises a magneto-resistive sensor 405 and electrode patterns 406 provided on both sides thereof. The magneto-resistive sensor is sandwiched between the lower recording magnetic pole-cum-upper shield layer 404 and the lower shield layer 407. The gap between the two shield layers was 0.1 μm. Incidentally, in this figure, a gap layer between the recording magnetic poles and gap layers between the shield layers are omitted.

FIG. 9 is a sectional structure of a magneto-resistive sensor. A signal detection area 500 of the magnetic sensor comprises a magneto-resistive sensor (a spin-valve type regenerating element), which includes a plurality of electrically conductive, magnetic films in which a large resistance change occurs in response to a relative change of magnetization direction which relative change is caused by an external magnetic field and an electrically conductive, non-magnetic film located between the electrically conductive, magnetic films. The structure of this magnetic sensor is such that a Ta buffer layer 502, a first magnetic film 503, an intermediate layer made of copper 504, a second magnetic film 505 and an antiferromagnetic film made of an Fe-50 at. % Mn alloy are formed in this order on a gap layer 501. An Ni-20 at. % Fe alloy was used in the above first magnetic film, and cobalt was used in the second magnetic film. The magnetization of the second magnetic film is limited to one direction by an exchange magnetic field from the antiferromagnetic film. In contrast to this, the magnetization direction of the first magnetic film, which is in contact with the second magnetic film via the non-magnetic film, changes due to a leakage magnetic field from the magnetic recording medium and, therefore, a resistance change occurs.

At both ends of the signal detection area, there are provided tapered portions 507 which are worked in a taper form. The tapered portions comprise permanent magnet layers 508 for converting the first magnetic layer into a single domain and a pair of electrodes 406 for taking out signals formed thereon. It is necessary that the permanent magnet layers have a large coercivity and that the magnetization direction of the permanent magnet layers does not change easily and, therefore, a Co—Cr—Pt alloy was used in the permanent magnet layers.

The magnetic storage system shown in FIG. 7 was fabricated by combining one of the magnetic recording mediums of the invention described in Embodiments 7 to 10 or the magnetic recording medium formed through the use of Target (3) in Embodiment 5 and the above head shown in FIG. 8.

In all cases where any one of the above mediums was used, a recording density of not less than 20 gigabits per square inches was able to be realized because of the magnetic storage system thus fabricated.

As the magnetic head used in this example, a magneto-resistive magnetic head was formed on a magnetic head slider with the area of a floating-face rail of not more than 1.4 mm$^2$ and a mass of not more than 2 mg. The impact resistance of the magnetic head can be improved by this area of the floating-face rail of not more than 1.4 mm$^2$ and the mass of not more than 2 mg. This enabled a high recording density and a high impact resistance to be compatible with each other and as a result, a mean time between failures (MTBF) of not less than 300,000 hours was realized at a recording density of not less than 20 gigabits per inch$^2$.

Embodiment 13

When forming the magnetic recording medium disclosed in Embodiment 1, an underlayer film of a single layer was formed without forming the second underlayer 13. That is, on each of the surfaces of the substrate 11, a first underlayer 12 containing chromium as the main constituent thereof and having the thickness of 15 nm was formed in the first, underlayer-forming chamber 22. After that, the substrate having the underlayer was heated at about 230° C. in the heating chamber 23 by use of a lamp heater, and then it was held for 9 seconds under vacuum in the second, underlayer-forming chamber 24 without forming any second underlayer 13, that is, without performing the sputtering of Cr-12 at. % W alloy target. On the underlayer 12 of the single layer, the first magnetic layer 15 was formed by sputtering a Co-4 at. % B-19 at. % Cr-10 at. % Ge alloy target. In this case, the thickness of the magnetic layer was controlled so that the value of Bt×t measured by use of the vibrating sample magnetometer became about 3.2 mA (40 gauss.micrometer). On the first magnetic layer 15, a protective coating having a thickness of 2 nm was formed in each of two, protective-layer-forming chambers 29 and 29' so that a protective layer 18 having a total thickness of 4 nm was formed. Then, the substrate having these layers was taken out the sputtering apparatus, and a lubricant containing perfluoroalkyl plyether as the main constituent thereof was applied onto the protective layer, so that a lubricating layer 19 having a thickness of 2 nm was formed.

When forming the first underlayer 12 and the first magnetic layer 15, Ar gas having gas pressure of 0.93 Pa (7 mTorr) was used as an electric discharge gas. Further, when forming the protective layer 18 made of carbon, Ar gas containing nitrogen gas and having gas pressure of 1.33 Pa (10 mTorr) was used as an electric discharge gas.

A magnetic recording medium thus formed was cut, a layered thin film portion thereof being thinned from the top toward the bottom into a mortar shape in the vertical direction of the thin film by use of the ion thinning process, and the grain size of the magnetic layer was observed at an accelerating voltage of 200 kV by use of the transmission electron microscope. As a result, the average grain size of the magnetic layer was 13.6 nm, and the standard deviation of the grain size was 3.0 nm. These values are larger than those of the magnetic recording medium formed in Embodiment 1. The average grain size was obtained in the same process as in Embodiment 1. The magnetic properties of a resultant magnetic disk was then evaluated by use of the sample-vibrating magnetometer, with the result that the longitudinal coercivity was 201 kA/m, the coercive squareness S* being 0.7, the saturation magnetic flux density Ms being about 0.4 T, and the squareness was 0.8.

As the first underlayer, there may be used a thin film of non-magnetic Cr base alloy such as Cr—V, or Cr—Mo, or Cr—W, or Cr—Ti, or Cr—Si or etc. which Cr base alloy makes it possible to from irregular solid solution having good crystalline conformity with the magnetic layer and capable of (100) orientation. By making the underlayer contain oxygen of 1,000 ppm to 10,000 ppm, it was also possible to reduce medium noise.

According to the invention, it is possible to provide a low-noise magnetic recording medium of low thermal demagnetization and a large-capacity magnetic storage system capable of high-density recording with a recording density exceeding 20 Gb/inch$^2$.

What is claimed is:

1. A magnetic recording medium comprising a substrate, an underlayer provided on the substrate, and a recording film provided on the underlayer which recording film is formed of at least one magnetic layer, said at least one magnetic layer being made of an alloy containing cobalt as the main constituent thereof, chromium and germanium as additives of the alloy, and containing phosphorous as a third additive of the alloy, wherein a value of Br×t, in which said "Br" is residual magnetic flux density of said recording film when measured while applying a magnetic field in a relative traveling direction of a magnetic head during recording to the recording medium and in which said "t" is a thickness of the recording film, is not less than 1.6 mA but not more than 5 mA.

2. A magnetic recording medium according to claim 1, said at least one magnetic layer containing platinum as fourth additive of the alloy.

3. A magnetic recording medium according to claim 1, said underlayer being provided with a layered structure having at least two layers.

4. A magnetic recording medium comprising a substrate, an underlayer provided on the substrate, and a recording film provided on the underlayer which recording film is formed of at least one magnetic layer, said at least one magnetic layer being made of an alloy consisting essentially, by atomic percent, of 1 to 14% boron, 15 to 28% chromium, 5 to 22% germanium, and the balance cobalt and incidental impurities, a total of the contents of boron and chromium being not less than 20 but not more than 32 atomic %.

5. A magnetic recording medium comprising a substrate, an underlayer provided on the substrate, and a recording film provided on the underlayer which recording film is formed of at least one magnetic layer, said at least one magnetic layer being made of an alloy consisting essentially, by atomic percent, of 1 to 12% phosphorus, 15 to 28% chromium, 5 to 22% germanium, and the balance cobalt and incidental impurities, a total of the contents of phosphorus and chromium being not less than 20 but not more than 32 atomic %.

6. A magnetic recording medium comprising a substrate, an underlayer provided on the substrate, and a recording film provided on the underlayer which recording film is formed of at least one magnetic layer, said at least one magnetic layer being made of an alloy consisting essentially, by atomic percent, of 1 to 14% boron, 15 to 28% chromium, 5 to 22% germanium, 2 to 14% platinum, and the balance cobalt and incidental impurities, a total of the contents of germanium and platinum being not less than 17 but not more than 24 atomic %.

7. A magnetic recording medium comprising a substrate, an underlayer provided on the substrate, and a recording film provided on the underlayer which recording film is formed of at least one magnetic layer, said at least one magnetic layer being made of an alloy consisting essentially, by atomic percent, of 1 to 12% phosphorus, 15 to 28% chromium, 5 to 22% germanium, 2 to 14% platinum, and the balance cobalt and incidental impurities, a total of the contents of phosphorus and chromium being not less than 20 but not more than 32 atomic %.

8. A magnetic storage system comprising a magnetic recording medium, a drive portion for driving the magnetic recording medium, a magnetic head provided with a writing part and a regenerating part, means for relatively moving said magnetic head with respect to said magnetic recording medium, a mechanical part for holding said magnetic head, means for inputting signals into the magnetic head, and recording, regenerating signals-processing means for regenerating output signals transferred from said magnetic head, said regenerating part of the magnetic head comprising a magneto-resistive sensor including: a plurality of electrically conductive, magnetic films in which a large resistance change occurs in response to relative change of magnetization direction which relative change is caused by external magnetic field; and at least one electrically conductive, non-magnetic film located between said electrically conductive, magnetic films, said magnetic recording medium comprising a substrate, an underlayer provided on the substrate, and a recording film provided on the underlayer which recording film is formed of at least one magnetic layer, said at least one magnetic layer being made of an alloy containing cobalt as the main constituent thereof, chromium and germanium as additives of the alloy, and containing phosphorus, as third additive of the alloy, wherein a value of Br×t, in which said "Br" is residual magnetic flux density of said recording film when measured while applying a magnetic field in a relative traveling direction of a magnetic head during recording to the recording medium and in which said "t" is a thickness of the recording film, is not less than 1.6 mA but not more than 5 mA.

9. A magnetic storage system comprising a magnetic recording medium, a drive portion for driving the magnetic recording medium, a magnetic head provided with a writing part and a regenerating part, means for relatively moving said magnetic head with respect to said magnetic recording medium, a mechanical part for holding said magnetic head, means for inputting signals into the magnetic head, and recording, regenerating signals-processing means for regenerating output signals transferred from said magnetic head, said regenerating part of the magnetic head comprising a magneto-resistive sensor including: a plurality of electrically conductive, magnetic films in which a large resistance change occurs in response to relative change of magnetization direction which relative change is caused by external magnetic field; and at least one electrically conductive, non-magnetic film located between said electrically conductive, magnetic films, said magnetic recording medium comprising a substrate, an underlayer provided on the substrate, and a recording film provided on the underlayer which recording film is formed of at least one magnetic layer, said at least one magnetic layer being made of an alloy consisting essentially, by atomic percent, of 1 to 14% boron, 15 to 28% chromium, 5 to 22% germanium, and the balance cobalt and incidental impurities, a total of the contents of boron and chromium being not less than 20 but not more than 32 atomic %.

10. A magnetic storage system comprising a magnetic recording medium, a drive portion for driving the magnetic recording medium, a magnetic head provided with a writing part and a regenerating part, means for relatively moving said magnetic head with respect to said magnetic recording medium, a mechanical part for holding said magnetic head, means for inputting signals into the magnetic head, and recording, regenerating signals-processing means for regenerating output signals transferred from said magnetic head, said regenerating part of the magnetic head comprising a magneto-resistive sensor including: a plurality of electrically conductive, magnetic films in which a large resistance change occurs in response to relative change of magnetization direction which relative change is caused by external magnetic field; and at least one electrically conductive, non-magnetic film located between said electrically conductive, magnetic films, said magnetic recording medium comprising a substrate, an underlayer provided on the substrate, and a recording film provided on the underlayer which recording film is formed of at least one magnetic layer, said at least one magnetic layer being made of an alloy consisting essentially, by atomic percent, of 1 to 14% boron, 15 to 28% chromium, 5 to 22% germanium, 2 to 14% platinum, and the balance cobalt and incidental impurities, a total of the contents of germanium and platinum being not less than 17 but not more than 24 atomic %.

11. A magnetic storage system comprising a magnetic recording medium, a drive portion for driving the magnetic recording medium, a magnetic head provided with a writing part and a regenerating part, means for relatively moving said magnetic head with respect to said magnetic recording medium, a mechanical part for holding said magnetic head, means for inputting signals into the magnetic head, and recording, regenerating signals-processing means for regenerating output signals transferred from said magnetic head, said regenerating part of the magnetic head comprising a magneto-resistive sensor including: a plurality of electrically conductive, magnetic films in which a large resistance change occurs in response to relative change of magnetization direction which relative change is caused by external magnetic field; and at least one electrically conductive, non-magnetic film located between said electrically conductive, magnetic films, said magnetic recording medium comprising a substrate, an underlayer provided on the substrate, and a recording film provided on the underlayer which recording film is formed of at least one magnetic layer, said at least one magnetic layer being made of an alloy consisting essentially, by atomic percent, of 1 to 12% phosphorus, 15 to 28% chromium, 5 to 22% germanium, and the balance cobalt and incidental impurities, a total of the contents of phosphorus and chromium being not less than 20 but not more than 32 atomic %.

12. A magnetic storage system comprising a magnetic recording medium, a drive portion for driving the magnetic recording medium, a magnetic head provided with a writing part and a regenerating part, means for relatively moving said magnetic head with respect to said magnetic recording medium, a mechanical part for holding said magnetic head, means for inputting signals into the magnetic head, and recording, regenerating signals-processing means for regenerating output signals transferred from said magnetic head, said regenerating part of the magnetic head comprising a magneto-resistive sensor including: a plurality of electrically conductive, magnetic films in which a large resistance change occurs in response to relative change of magnetization direction which relative change is caused by external magnetic field; and at least one electrically conductive, non-magnetic film located between said electrically conductive, magnetic films, said magnetic recording medium comprising a substrate, an underlayer provided on the substrate, and a recording film provided on the underlayer which recording film is formed of at least one magnetic layer, said at least one magnetic layer being made of an alloy consisting essentially, by atomic percent, of 1 to 12% phosphorus, 15 to 28% chromium, 5 to 22% germanium, 2 to 14% platinum, and the balance cobalt and incidental impurities, a total of the contents of phosphorus and chromium being not less than 20 but not more than 32 atomic %.

\* \* \* \* \*

UNITED STATES PATENT AND TRADEMARK OFFICE
CERTIFICATE OF CORRECTION

PATENT NO. : 6,583,958 B1
DATED : June 24, 2003
INVENTOR(S) : Hiroyuki Suzuki et al.

It is certified that error appears in the above-identified patent and that said Letters Patent is hereby corrected as shown below:

Column 2,
Line 43, change "JP-A-60-28637" to -- JP-A-60-228637 --.

Column 17,
Line 42, change "a Co-1 at." to -- a Co-5 at. --.

Column 18,
Line 44, change "% Pt alloy" to -- % P alloy --.

Signed and Sealed this

Sixth Day of July, 2004

JON W. DUDAS
*Acting Director of the United States Patent and Trademark Office*